UNITED STATES PATENT OFFICE.

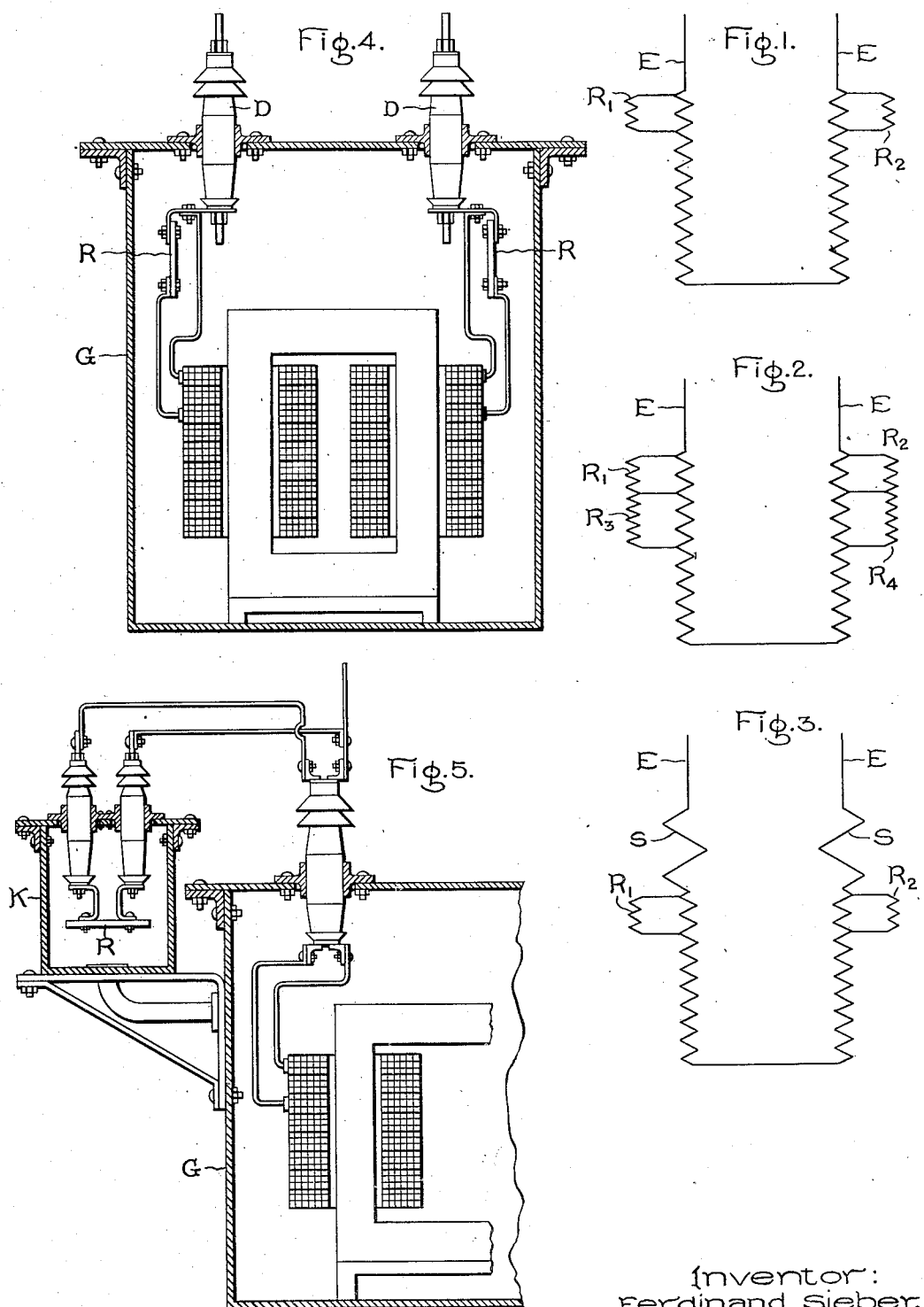

FERDINAND SIEBER, OF CHARLOTTENBURG, GERMANY, ASSIGNOR TO GENERAL ELECTRIC COMPANY, A CORPORATION OF NEW YORK.

EXCESS-VOLTAGE ABSORBER.

1,242,729.     Specification of Letters Patent.     Patented Oct. 9, 1917.

Application filed August 11, 1916. Serial No. 114,482.

*To all whom it may concern:*

Be it known that I, FERDINAND SIEBER, a subject of the Emperor of Austria-Hungary, residing at Charlottenburg, Germany, have invented certain new and useful Improvements in Excess-Voltage Absorbers, of which the following is a specification.

It has been proposed to protect the windings of electrical devices and apparatus against excessive voltages, surges and similar disturbances by connecting in the supply wires of the apparatus an inductance shunted by a resistance. The object of my invention is to provide improved protecting means which is simpler, more compact and more desirable than the means heretofore proposed. To this end the protective device is located in and made a part of the apparatus or machine to be protected, instead of being a separate and distinct device located in the supply wire. This desirable result is attained by utilizing the inductance of a portion of an active winding, that is, a winding which takes an active part in the normal operation of the apparatus under normal conditions, and by connecting an external or protective resistance in parallel with a portion of this active winding. In order to give sufficient damping and avoid continuous losses this protective resistance should be very large. For example, a rod having a chemical composition approximately that of silicon carbonitrid, and sold under the trade name of Silit, may be employed to advantage.

My invention will best be understood in connection with the accompanying drawing in which merely for purposes of illustration, I have shown some of the various forms in which my invention may be embodied, particularly in connection with transformers and in which, Figure 1 is a diagram of a transformer winding provided with a protective resistance in accordance with my invention; Fig. 2 is a diagram of a transformer winding provided with protective resistances differing in amount; Fig. 3 is a diagram showing a transformer winding having the usual end turns and provided with a protective resistance in accordance with my invention; Fig. 4 is a longitudinal section of a transformer embodying one form of my invention, and Fig. 5 is a longitudinal section of a transformer embodying another form of my invention.

In the particular form of embodiment illustrated in Fig. 1, the protective resistances $R_1$ and $R_2$ are connected in parallel to some of the turns of one of the active windings of the transformer, as for example, the primary winding connected to the line wires E. The active winding of the transformer has considerable inductance owing to the presence of the iron core, and the protective resistances are connected across those parts of the winding that are connected directly to the supply wires E. In the embodiment illustrated in Fig. 2 those parts of the active winding directly connected to the supply wires are used for giving protection against excessive voltage, surges, and similar disturbances by connecting two protective resistances $R_1$ and $R_2$ in shunt to the active winding and across the turns near the ends of the winding. Two additional protective resistances $R_3$ and $R_4$ are also connected in shunt to other turns of the winding adjacent the turns connected to the resistances $R_1$ and $R_2$. In this way a more thorough and better protection is obtained than where only the resistances $R_1$ and $R_2$ are used. In any case, the protective resistances $R_1$ and $R_2$ are equal in amount and the resistances $R_3$ and $R_4$ are also equal to each other, but $R_1$ and $R_3$ as well as $R_2$ and $R_4$ differ from each other in magnitude.

In the modification shown in Fig. 3, the transformer has the usual end turns S provided with thickened insulation and connected directly to the supply wires E. In this modification, the protective resistances $R_1$ and $R_2$ are connected in shunt to the active winding of the transformer and across those parts of the winding immediately behind or adjoining the end turns S.

The best results are obtained if the protective resistances are submerged in oil or similar liquid. One desirable way of obtaining this result is that illustrated in Fig. 4 in which a protective resistance R is mounted in the tank G of the transformer in a position to be submerged in the oil. As shown in this figure, the resistance may be mounted in a simple manner on the insulators D of the transformer. A desirable modification is that shown in Fig. 5 in which the protective resistances are mounted under the oil in an auxiliary tank or receptacle K which is in connection with the tank G of the transformer. The resistances may be mounted in a very simple manner on the insulators in the cover of the vessel K.

By my invention, the energy of the surge or of excess voltage entering the transformer is dissipated in the protective resistances in a very reliable manner as the resistances always maintain their characteristics because of being submerged in the oil. Better results are obtained by connecting the protective resistances across part of the turns of the active winding of the apparatus than are secured by using a separate winding which is connected in series with the apparatus but performs no function under normal conditions and is nothing more than a protective device. Electrical apparatus embodying my invention is more thoroughly protected, is much more compact, and is cheaper than is the case where the protective winding is not an active and integral part of the apparatus to be protected, but is a separate and distinct device connected in the supply wire.

What I claim as new and desire to secure by Letters Patent of the United States, is,—

1. A translating device having an iron member and a conducting winding in inductive relation to said member, an oil tank in which said winding is mounted below the normal level of the oil, and a resistance mounted to be normally submerged in the oil and connected in parallel with part of the end turns of said winding and proportioned to dissipate the energy generated in said end turns by surges and similar abnormal conditions.

2. An electromagnetic translating device having an iron magnetic circuit and two windings with all the turns of the first winding in active inductive relation to the second winding and to said magnetic circuit, an oil tank in which said windings are mounted below the normal oil level, a resistance mounted in the tank beneath the oil level and connected in parallel with part of the end turns of said first winding.

3. A transformer comprising an oil tank, primary and secondary windings mounted in said tank in active inductive relation to each other and to an iron magnetic circuit and an external resistance normally submerged in the oil in said tank and connected across part of the end turns of one of the windings of said transformer and proportioned to dissipate the energy generated in said end turns.

In witness whereof, I have hereunto set my hand this fourteenth day of March, 1916.

FERDINAND SIEBER.

Witnesses:
HENRY HASPER,
ALICE M. SAATZ.